United States Patent
Zhou (10) Patent No.: US 10,004,001 B2
(45) Date of Patent: Jun. 19, 2018

(54) USER EQUIPMENT, BASE STATION, AND STREAMING MEDIA ADAPTIVE TRANSMISSION SYSTEM AND METHOD

(71) Applicant: Huawei Technologies Co., Ltd., Shenzhen (CN)

(72) Inventor: Lei Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 14/757,714

(22) Filed: Dec. 23, 2015

(65) Prior Publication Data

US 2016/0127954 A1    May 5, 2016

Related U.S. Application Data

(63) Continuation of application No. PCT/CN2014/073467, filed on Mar. 14, 2014.

(30) Foreign Application Priority Data

Jun. 25, 2013   (CN) .......................... 2013 1 0256579

(51) Int. Cl.
   H04W 28/22 (2009.01)
   H04W 28/02 (2009.01)
   H04L 12/927 (2013.01)

(52) U.S. Cl.
   CPC ....... *H04W 28/22* (2013.01); *H04W 28/0268* (2013.01); *H04L 47/803* (2013.01)

(58) Field of Classification Search
   None
   See application file for complete search history.

(56) References Cited

U.S. PATENT DOCUMENTS

2004/0057412 A1    3/2004  Curcio et al.
2005/0033879 A1*   2/2005  Hwang ................. H04L 1/0002
                                                  710/52

(Continued)

FOREIGN PATENT DOCUMENTS

CN      1756252 A    4/2006
CN      1946087 A    4/2007

(Continued)

OTHER PUBLICATIONS

Foreign Communication From a Counterpart Application, European Application No. 14817812.2, Extended European Search Report dated May 6, 2016, 8 pages.

(Continued)

*Primary Examiner* — Nicholas Sloms
(74) *Attorney, Agent, or Firm* — Conley Rose, P.C.

(57) ABSTRACT

A streaming media adaptive transmission method is presented, which may include determining in real time, by user equipment, a transmission rate of to-be-transmitted data, or determining a transmission rate according to a negotiation request that includes an option of a transmission rate and is provided by a base station; sending, by the user equipment, a rate guarantee request to the base station, where the rate guarantee request includes the transmission rate; and after receiving a message that is for confirming that the transmission rate is available and that is returned by the base station, requesting, by the user equipment from a data sending end, to-be-transmitted data of which an encoding rate is corresponding to the transmission rate. User equipment, a base station, and a streaming media adaptive transmission system are further disclosed.

7 Claims, 6 Drawing Sheets

(56) References Cited

U.S. PATENT DOCUMENTS

| | | | |
|---|---|---|---|
| 2008/0057963 A1* | 3/2008 | Kayama | H04L 1/0007 455/442 |
| 2009/0161688 A1* | 6/2009 | Park | H04W 48/08 370/441 |
| 2009/0164653 A1 | 6/2009 | Mandyam et al. | |
| 2012/0108250 A1 | 5/2012 | Ahn et al. | |
| 2015/0087233 A1* | 3/2015 | Kim | H04W 4/008 455/41.2 |
| 2016/0050246 A1* | 2/2016 | Liao | H04L 5/0085 709/219 |

FOREIGN PATENT DOCUMENTS

| | | |
|---|---|---|
| CN | 1992936 A | 7/2007 |
| CN | 101150763 A | 3/2008 |
| CN | 102045782 A | 5/2011 |
| EP | 2448353 A2 | 5/2012 |

OTHER PUBLICATIONS

Partial English Translation and Abstract of Chinese Patent Application No. CN1992936, Apr. 9, 2016, 11 pages.
Foreign Communication From a Counterpart Application, PCT Application No. PCT/CN2014/073467, English Translation of International Search Report dated Jun. 23, 2014, 2 pages.
Foreign Communication From a Counterpart Application, PCT Application No. PCT/CN2014/073467, English Translation of Written Opinion dated Jun. 23, 2014, 10 pages.
Machine Translation and Abstract of Chinese Publication No. CN102045782, May 4, 2011, 11 pages.

\* cited by examiner

FIG. 1

(Prior Art)

FIG. 2

(Prior Art)

USER EQUIPMENT, BASE STATION, AND STREAMING MEDIA ADAPTIVE TRANSMISSION SYSTEM AND METHOD

CROSS REFERENCE

This application is a continuation of International Application No. PCT/CN2014/073467, filed on Mar. 14, 2014 which claims priority to Chinese Patent Application No. 201310256579.3, filed on Jun. 25, 2013, both of which are hereby incorporated by reference in their entireties.

TECHNICAL FIELD

The present disclosure relates to the field of computer and communications technologies, and in particular, to user equipment, a base station, and a streaming media adaptive transmission system and method.

BACKGROUND

Wireless communications has been widely applied globally, which greatly facilitates communication between people. The wireless communications can provide a variety of services, including voice calls, webpage downloads, and the like. A typical wireless communications system or network, for example, a Long Term Evolution (LTE) system provides, in a cellular cell, a radio link for multiple user equipment (UE) using a base station, to implement wireless communication. For the wireless connection, a shared wireless spectrum is generally used.

With the development of the Internet, new services are constantly emerging. However, performance of many services in a wireless network still cannot meet people's needs. Mobile streaming media services are classified into play online and play after download, where play online supports both play on live and play on demand. Compared with play after download, play online can greatly reduce a start-up delay, avoiding a drawback that a user can view a file only after the entire file is completely downloaded from a server. In a process of playing mobile streaming media online, an ideal situation is that a transmission bandwidth is maintained to be slightly larger than an encoding bandwidth of media content being transmitted. However, an encoding rate of the media content may change, for example, variable bit rate (VBR) video or audio; and a radio resource required by each user may not always be guaranteed due to a problem of wireless spectrum sharing in a wireless network. In addition, a wireless channel for communication between a user and a base station has an attenuating characteristic, which results in fluctuation of a wireless communications rate, thereby further affecting stability of streaming media transmission, causing a stuttering or mosaic phenomenon in a process of playing on a receiving terminal of the user, and affecting the user's experience in media playing. A same problem also occurs in a wireless video call.

Figure 1:
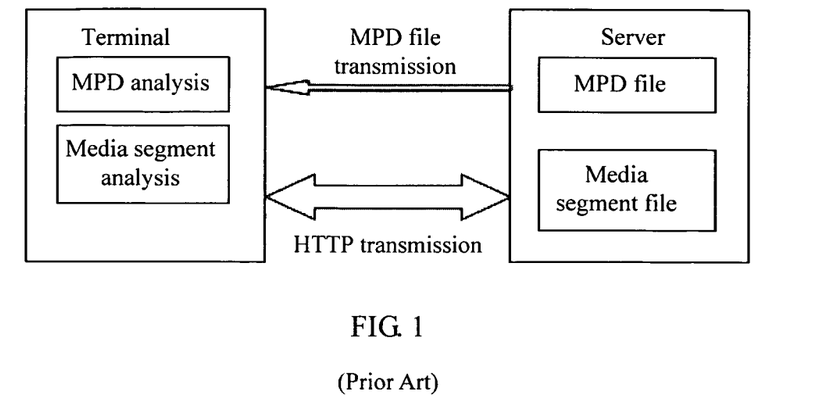
FIG. 1 is a schematic diagram of an existing DASH system.

Dynamic adaptive streaming over Hypertext Transfer Protocol (DASH) is used on the Internet to provide good experience in play on live and play on demand of streaming media. DASH is used to transmit high-speed video and audio data over the Hypertext Transfer Protocol (HTTP). HTTP has been well supported on the Internet and can easily penetrate a firewall, which reduces implementation costs of DASH. That a client adaptively requests, based on the HTTP protocol, content from a server also greatly reduces pressure on the server, so that the server does not need to store statuses of a large number of users, which can effectively increase a quantity of users served by the server. A typical application of DASH is shown in FIG. 1. A media presentation description (MPD) file and a media segment file are stored on a server. The MPD file includes related information of the media segment file, such as a time length, a file size, a play start time, a file storage website, a media type, and a resolution that are of the media segment file. The media segment file stores actual play data of streaming media, where the actual play data of streaming media may be stored in one or more files. Generally, a manner of using multiple files is used, where one segment, for example, media content of 2 seconds, is stored in one file. To adapt to different network bandwidth conditions, same media content is stored in different files according to different encoding rates. For example, for transmission rates of 5 megabits per second (Mbps), 2 Mbps, and 500 kilobits per second (Kbps), three different files of the media content of which average encoding rates are 4.8 Mbps, 1.7 Mbps, and 490 Kbps respectively may be prepared and stored on the server. A media file can be played online smoothly only when a transmission rate is higher than an encoding rate of the media file.

When a user expects to accept a DASH service, a terminal needs to first acquire the MPD file from the server, where the file may be acquired in multiple manners, for example, by means of broadcasting or by performing direct acquisition from the server using an HTTP request. After acquiring the MPD file, the terminal knows the information about the media segment file on the server, such as the type, a storage location, a length of each segment, the file size, and the like of the media segment file. The terminal can also measure a transmission bandwidth of an entire network from the server to the terminal, and determine a transmission rate of a media segment file for which the terminal needs to apply to the server. For example, when the terminal measures that the transmission bandwidth of the network is greater than 5 Mbps, the terminal may apply to the server for a media segment that is for a transmission rate of 5 Mbps (that is, a media file of which an average encoding rate is less than and closer to 5 Mbps); and if the transmission bandwidth of the network is only 3 Mbps, the terminal applies to the server for only a media segment file that is for a transmission rate of 2 Mbps, and does not apply for a file that is for a transmission rate of 5 Mbps, so as to avoid network transmission congestion and influence on the user's experience.

When the foregoing method is applied in a wired environment, pressure of adaptive processing may be placed on the terminal, thereby reducing a burden on the server and increasing a quantity of users that is served by the server at the same time. However, when the method is applied in a wireless environment, or when at least a part of an entire transmission process involves wireless transmission, due to the existence of the foregoing wireless problem, a transmission rate measured by the terminal cannot be guaranteed in a wireless network, therefore performance of the terminal is significantly deteriorated.

Figure 2:
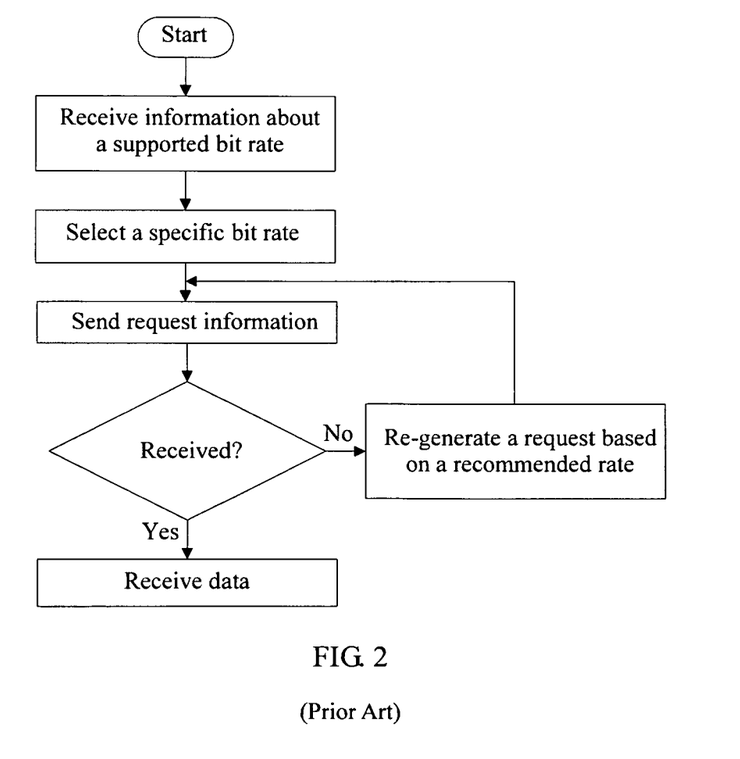
FIG. 2 is a flowchart of a method for configuring a minimum rate in the prior art.

Currently, there are some solutions that implement online playing of mobile streaming media in a wireless environment. An existing method for configuring a minimum rate on UE (user equipment, user equipment) is shown in FIG. 2. The UE selects a guaranteed bit rate (GBR) according to an option provided by a network, and sends the GBR to the network using a request message for confirmation. After the confirmation, the UE can perform communication according to an agreed GBR. However, in this solution, the GBR is selected by means of user input, which corresponds to the second step in FIG. 2 of selecting a specific bit rate. Apart from this method, this solution does not disclose another method for selecting a rate to ensure experience of a mobile streaming media service. Considering a change of an objective condition of a wireless environment, for example, channel fading, and a change of a size of a media file, for example a VBR video, that is, a change of a media encoding compression ratio, it is obvious that, by means of user selection, an adaptive adjustment of a transmission rate in real time cannot be supported.

According to an existing streaming media transmission method, a receiving side acquires at least a maximum bit rate or a maximum service data unit size for transmission, thereby achieving an objective of reserving network resources. In the method, when a user selects media to view, wireless user equipment sends a request to a wireless network, and the request is sent to a streaming media server. The streaming media server checks content of the request, and acquires related information, where the related information should include at least a maximum bit rate. The information is then transmitted to the wireless network and the wireless user equipment from the streaming media server. The wireless user equipment sends a request including at least the maximum bit rate to the wireless network, and the wireless network selects a bearer service. A transmission parameter selected by the wireless network may be lower than a requested rate. A selection result of the wireless network is transmitted back to the wireless user equipment, and a connection is established for communication. This solution is different from a DASH method. In this method, the server needs to acquire information about the maximum bit rate and transmit the information back to the wireless network and the wireless user equipment. Compared with a manner, in the DASH method, of determining a rate completely by a terminal and directly requesting related content, this method increases a burden of the server. Secondly, a manner of reserving resources using a maximum bit rate is a conventional circuit switched (CS) communication method. This method causes a waste of resources because reserved resources cannot be allocated to other users for use. As described above, in wireless communications, valuable wireless spectrum resources serve multiple users at the same time in a shared manner. For a case in which media encoding compression ratios are different, especially when a VBR video service is provided, this manner of reserving resources according to a maximum bit rate greatly wastes wireless spectrum resources. Finally, in the DASH method, an MPD file is transmitted to wireless user equipment for analysis, and an analysis result does not need to be sent to a wireless network. Therefore, the wireless network does not know a real need of a user for a media service, and a bearer service selected by the wireless network may meet an experience need of the user. However, in the foregoing method, the wireless user equipment does not implement a corresponding remedial measure for this situation.

SUMMARY

Embodiments of the present disclosure provide user equipment, a base station, and a streaming media adaptive transmission system and method, to resolve a problem in the prior art that a transmission rate cannot be guaranteed when streaming media is transmitted in a wireless environment.

To resolve the foregoing technical problem, the embodiments of the present disclosure disclose the following technical solutions.

According to a first aspect, a streaming media adaptive transmission method is provided, including determining in real time, by user equipment, a transmission rate of to-be-transmitted data, or determining a transmission rate according to a negotiation request that includes an option of a transmission rate and is provided by a base station; sending, by the user equipment, a rate guarantee request to the base station, where the rate guarantee request includes the transmission rate; and after receiving a message that is for confirming that the transmission rate is available and that is returned by the base station, requesting, by the user equipment from a data sending end, to-be-transmitted data of which an encoding rate is corresponding to the transmission rate.

In a first possible implementation manner of the first aspect, the determining in real time, by user equipment, a transmission rate of to-be-transmitted data includes monitoring in real time cache usage in the user equipment; acquiring a media presentation description MPD file from the data sending end; and calculating an average transmission rate according to the cache usage, a size of a to-be-transmitted media file in the MPD file, and a predetermined future time period, and using the average transmission rate as the transmission rate during the predetermined future time period.

In a second possible implementation manner of the first aspect, the determining in real time, by user equipment, a transmission rate of to-be-transmitted data includes negotiating in real time, by the user equipment, with the data sending end to determine an uplink transmission rate for the data sending end, sending a downlink transmission rate that can be guaranteed by the user equipment to the data sending end, and selecting a smaller rate from the uplink transmission rate and the downlink transmission rate as the finally determined transmission rate.

In a third possible implementation manner of the first aspect, the rate guarantee request further includes one or more rates that are greater than the transmission rate and are requested by the user equipment from the base station.

In a fourth possible implementation manner of the first aspect, when sending the rate guarantee request to the base station, the user equipment further requests, from the base station, a quality of service indicator including at least one of a packet loss rate, a bit error rate, and a maximum delay.

In a fifth possible implementation manner of the first aspect, the determining a transmission rate according to a negotiation request that includes an option of a transmission rate and is provided by a base station includes stopping transmission when no rate in the option of a transmission rate meets a minimum transmission rate required by the data sending end; or using a rate, which is greater than or equal to a minimum transmission rate, in the option of a transmission rate as the transmission rate.

According to a second aspect, a streaming media adaptive transmission method is provided, including receiving, by a base station, a rate guarantee request that includes a transmission rate and is sent by user equipment, and confirming, according to a spectrum resource that can be provided by the base station and a current transmission channel condition, whether the transmission rate can be guaranteed; if the transmission rate can be guaranteed, sending, to the user equipment, a message for confirming that the transmission rate is available; and if the transmission rate cannot be guaranteed, sending, to the user equipment, a negotiation request including an option of a transmission rate that can be guaranteed by the base station.

In a first possible implementation manner of the second aspect, after confirming the transmission rate requested by the user equipment, the method further includes configuring a quality of service indicator including at least one of a packet loss rate, a bit error rate, and a maximum delay.

In a second possible implementation manner of the second aspect, the method further includes sending, by the base station to the user equipment according to a transmission channel situation reported in real time by the user equipment, a negotiation request including an option of a transmission rate that can be currently guaranteed by the base station.

According to a third aspect, user equipment is provided, including an adaptive adjusting unit configured to determine in real time a transmission rate of to-be-transmitted data, or determine a transmission rate according to a negotiation request that includes an option of a transmission rate and is provided by a base station; a requesting unit configured to send a rate guarantee request to the base station, where the rate guarantee request includes the transmission rate; and a data requesting unit configured to, after receiving a message that is for confirming that the transmission rate is available and that is returned by the base station, request, from a data sending end, to-be-transmitted data of which an encoding rate is corresponding to the transmission rate.

In a first possible implementation manner of the third aspect, the adaptive adjusting unit includes a cache monitoring unit configured to monitor cache usage in the user equipment when the transmission rate of the to-be-transmitted data is being determined in real time; an MPD file acquiring unit configured to acquire, from the data sending end, a media presentation description MPD file of the to-be-transmitted data; and a transmission rate calculating unit configured to calculate an average transmission rate according to the cache usage, a size of a to-be-transmitted media file in the MPD file, and a predetermined future time period, and use the average transmission rate as the transmission rate during the predetermined future time period.

In a second possible implementation manner of the third aspect, the adaptive adjusting unit includes a rate negotiating unit configured to, when the transmission rate of the to-be-transmitted data is being determined in real time, negotiate in real time with the data sending end to determine an uplink transmission rate for the data sending end, send a downlink transmission rate that can be guaranteed by the user equipment to the data sending end, and select a smaller rate from the uplink transmission rate and the downlink transmission rate as the finally determined transmission rate.

In a third possible implementation manner of the third aspect, the rate guarantee request further includes one or more rates that are greater than the transmission rate and are requested by the user equipment from the base station.

In a fourth possible implementation manner of the third aspect, the requesting unit is further configured to, when sending the rate guarantee request to the base station, further request, from the base station, a quality of service indicator including at least one of a packet loss rate, a bit error rate, and a maximum delay.

In a fifth possible implementation manner of the third aspect, the adaptive adjusting unit further includes a rate selecting unit configured to trigger the connection and transmission unit to stop transmission when no rate in the option of a transmission rate in the negotiation request that includes the option of a transmission rate and is provided by the base station meets a minimum transmission rate required by the data sending end; or use a rate, which is greater than or equal to a minimum transmission rate, in the option of a transmission rate as the transmission rate.

According to a fourth aspect, a base station is provided, including a rate confirming unit configured to receive a rate guarantee request that includes a transmission rate and is sent by user equipment, and confirm, according to a spectrum resource that can be provided by the base station and a current transmission channel condition, whether the transmission rate can be guaranteed; if the transmission rate can be guaranteed, send, to the user equipment, a message for confirming that the transmission rate is available; and if the transmission rate cannot be guaranteed, send, to the user equipment, a negotiation request including an option of a transmission rate that can be guaranteed by the base station.

In a first possible implementation manner of the fourth aspect, the rate confirming unit is further configured to, after confirming the transmission rate requested by the user equipment, configure a quality of service indicator including at least one of a packet loss rate, a bit error rate, and a maximum delay.

In a second possible implementation manner of the fourth aspect, the base station further includes a rate adjusting unit configured to send, to the user equipment according to a transmission channel situation reported in real time by the user equipment, a negotiation request including an option of a transmission rate that can be currently guaranteed by the base station.

According to a fifth aspect, a streaming media adaptive transmission system is provided, including a data sending end device, user equipment, and a base station, where both the user equipment and the data sending end device are connected to the base station, where the user equipment determines in real time a transmission rate of to-be-transmitted data or determines a transmission rate according to a negotiation request that includes an option of a transmission rate and is provided by the base station, sends a rate guarantee request including the transmission rate to the base station, and after receiving a message that is for confirming that the transmission rate is available and that is returned by the base station, requests, from the data sending end device, to-be-transmitted data of which an encoding rate is corresponding to the transmission rate; the base station receives the rate guarantee request, and when the base station confirms, according to a spectrum resource that can be provided by the base station and a current transmission channel condition, that the rate guarantee request can be guaranteed, sends, to the user equipment, a message for confirming that the transmission rate is available; or when the base station confirms, according to a spectrum resource that can be provided by the base station and a current transmission channel condition, that the rate guarantee request cannot be guaranteed, sends a negotiation request including an option of a transmission rate to the user equipment; and the data sending end device receives the request sent by the user equipment, and transmits the to-be-transmitted data of which an encoding rate is corresponding to the transmission rate to the user equipment.

In the embodiments of the present disclosure, user equipment negotiates in real time with a base station, the base station ensures a transmission rate indicator required by the user equipment, and the user equipment requests corresponding content according to a negotiated rate indicator. In this way, user experience of a service in a wireless environment is ensured, that is, it is ensured that a picture is relatively clear in a case of smooth playing.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some rather than all of the embodiments of the present disclosure. All other embodiments obtained by a person of ordinary skill in the art based on the embodiments of the present disclosure without creative efforts shall fall within the protection scope of the present disclosure.

Different from transmission of streaming media data in a wired network, in wireless cellular communications, a base station needs to schedule allocation of a shared wireless spectrum resource among multiple users. Therefore, whether a transmission rate guarantee requested by user equipment UE can be supported needs to be confirmed by the base station.

Figure 3:
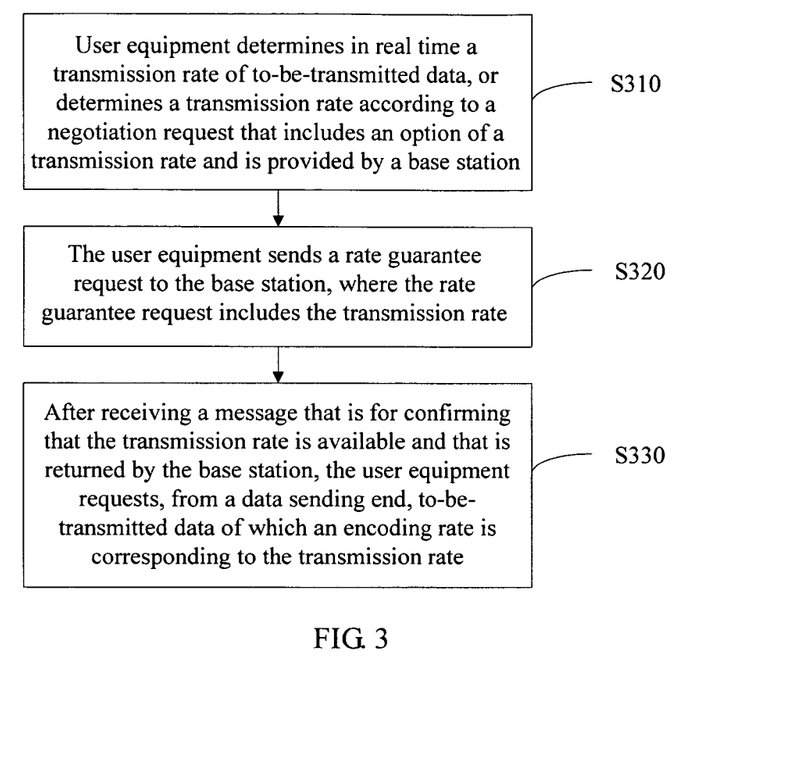
FIG. 3 is a flowchart of a streaming media adaptive transmission method according to an embodiment of the present disclosure.

As shown in FIG. 3, a streaming media adaptive transmission method provided by a first embodiment of the present disclosure includes the following steps.

Step S310: UE determines in real time a transmission rate of to-be-transmitted data, or determines a transmission rate according to a negotiation request that includes an option of a transmission rate and is provided by a base station.

For a scenario in which the user equipment requests streaming media from a streaming media server, the determining in real time, by user equipment, a transmission rate of to-be-transmitted data includes monitoring in real time cache usage in the user equipment; acquiring a media presentation description MPD file from a data sending end; and calculating an average transmission rate according to the cache usage, a size of a to-be-transmitted media file in the MPD file, and a predetermined future time period, and using the average transmission rate as the transmission rate during the predetermined future time period.

A calculation manner of the average transmission rate is calculating the average transmission rate in a manner of subtracting the cache usage from the size of the to-be-transmitted media file in the MPD file, and then dividing, by the predetermined time period, a result obtained by the subtracting.

The MPD file includes information about a size of a media segment, and the UE knows how much content has already been stored in a cache of the UE. By subtracting a size of the content that has already been stored in the cache from a size of the media segment in a future period of time, for example, in 2 seconds, and dividing, by the 2 seconds, a result obtained by the subtracting, an average transmission rate required for the next 2 seconds is calculated. To make transmission smoother, a transmission rate actually guaranteed by a wireless system should be slightly higher than this value.

For a video call scenario, a manner of the determining a transmission rate of to-be-transmitted data is negotiating in real time, by the user equipment, with the data sending end to determine an uplink transmission rate for the data sending end, sending a downlink transmission rate that can be guaranteed by the user equipment (receiving end of video and audio data) to the data sending end, and selecting a smaller rate from the uplink transmission rate and the downlink transmission rate as the finally determined transmission rate. It is assumed that the finally determined transmission rate is $V_{min}$, that is, it is determined that both the uplink transmission rate of the data sending end and the downlink transmission rate of the user equipment are $V_{min}$. In the video call scenario, the data sending end is generally peer UE (sending end of video and audio data).

In the foregoing two scenarios, the base station may be unable to meet a rate guarantee requested by the user equipment. In this case, the base station sends a negotiation request including an option of a transmission rate to the user equipment. The determining a transmission rate according to a negotiation request that includes an option of a transmission rate and is provided by a base station includes stopping transmission when no rate in the option of a transmission rate meets a minimum transmission rate required by the data sending end; or using a rate, which is greater than or equal to a minimum transmission rate, in the option of a transmission rate as the transmission rate.

Step S320: The user equipment sends a rate guarantee request to the base station, where the rate guarantee request includes the transmission rate. The user equipment may further request one or more rates that are greater than the transmission rate from the base station. For example, for a case in which average encoding rates are 4.8 Mbps, 1.7 Mbps, and 490 Kbps, the UE may apply to the base station for guaranteed transmission rates of which three GBR rates are 4.8 Mbps, 1.7 Mbps, and 490 Kbps, or the UE may require higher transmission rates, that is, transmission rates of 5 Mbps, 2 Mbps, and 500 Kbps, or the UE may apply to the base station for only the former two higher rates, that is, 5 Mbps and 2 Mbps. The base station may select an appropriate value, for example, the rate of 2 Mbps, from the transmission rates according to an actual situation, and confirm with the UE. If the UE agrees upon the selection of the rate of 2 Mbps, a finally negotiated transmission rate is 2 Mbps.

Further, to ensure transmission quality, a quality of service (QoS) indicator including at least one of a packet loss rate, a bit error rate, and a maximum delay is further applied for to the base station.

Step S330: After receiving a message that is for confirming that the transmission rate is available and that is returned by the base station, the user equipment requests, from a data sending end, to-be-transmitted data of which an encoding rate is corresponding to the transmission rate. For a scenario of online playing of streaming media, after establishing a connection with a streaming media server, the UE requests streaming media data with a corresponding encoding rate according to the transmission rate. For example, after the base station confirms a GBR rate of 2 Mbps by negotiating with the UE, the UE needs to apply to the streaming media server for a corresponding media segment file, that is, a media segment file of 1.7 Mbps, so that a picture during streaming media playing can be maintained to be as clear as possible and user experience can also be as good as possible on the premise of smooth playing. For a video call scenario, after establishing a connection with peer UE, the UE receives video and audio data of the peer UE according to the transmission rate.

Figure 4:
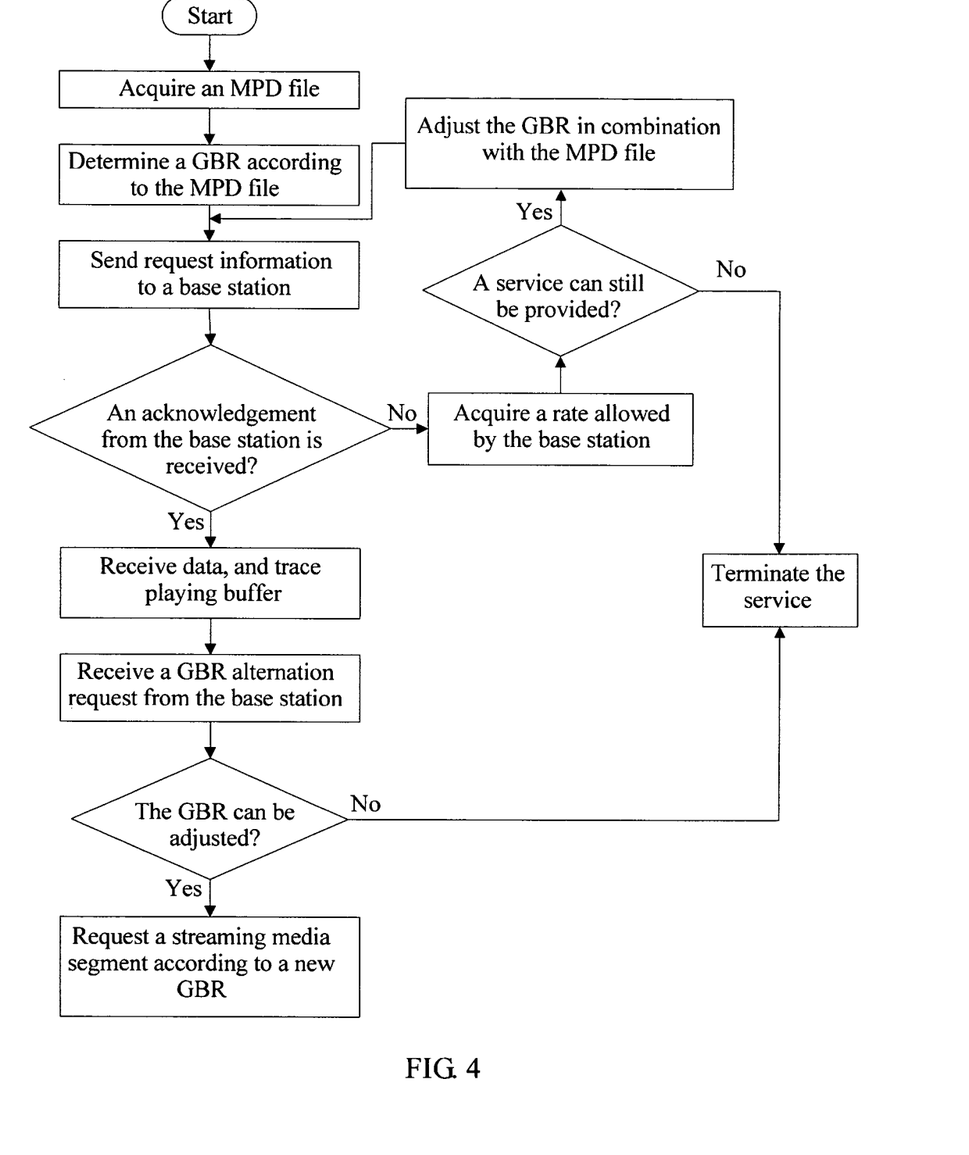
FIG. 4 is a flowchart of adaptively playing streaming media by user equipment in a streaming media adaptive transmission method according to an embodiment of the present disclosure.

The following provides description using an example in which user equipment adaptively plays streaming media. A specific process of the method in this embodiment is shown in FIG. 4.

The UE may apply to the base station for all the GBR rates, that is, the transmission rates of 5 Mbps, 2 Mbps, and 500 Kbps, or may apply to the base station for only the former two higher rate requests, that is, 5 Mbps and 2 Mbps. When requesting a GBR, the UE may also apply for another QoS indicator, such as a packet loss rate, a bit error rate, and a maximum delay. Such a request may be sent to the base station by means of high layer signaling, or may be sent to the base station using another message. After receiving a request of the UE for one or more GBRs, the base station confirms whether the base station can provide a guarantee of one of the rates for the UE. If the base station can provide a guarantee of one of the rates for the UE, the base station confirms the request of the UE and starts to configure a corresponding QoS parameter; and if the base station cannot provide a guarantee of any of the GBRs for the UE, the base station notifies the UE that a GBR parameter needs to be re-negotiated, and provides one or more optional rates.

After receiving a message or signaling indicating QoS re-negotiation of the base station, the UE determines, according to an option provided by the base station in combination with the media segment file information provided in the MPD file, whether the UE can continue to request a streaming media service within a range of the rates provided by the base station. If a GBR guarantee provided by the base station is lower than a requirement of the server for a minimum media rate, for example, the base station can provide only a GBR of 400 Kbps, which is lower than a transmission rate requirement of the server for a minimum media encoding rate of 490 Kbps, the UE may choose to stop a service, or select a streaming media service without a guarantee of service quality. If the GBR guarantee provided by the base station is lower than a minimum GBR applied by the UE but can still ensure experience of a minimum rate, for example, in a case in which the UE applies for only rate of 5 Mbps and 2 Mbps, the base station replies that only a rate guarantee of 800 Kbps can be provided, then the UE may consider lowering a requirement of service quality, re-apply to the base station for a GBR guarantee of 500 Kbps, and after confirmation by the base station, start to request a media segment file corresponding to an encoding rate of 490 Kbps from the server.

In a process of receiving data by the UE, the base station may actually provide, for the UE, an average transmission rate higher than a GBR value due to a cause such as a change of a channel condition, thereby resulting in accumulation of buffered data at the UE. When the buffered data at the UE accumulates to a sufficient amount, the UE can decide, in combination with the information about the media segment file size provided in the MPD file, whether the UE can re-negotiate a new GBR value with the base station, so as to lower pressure on the base station and reduce a service charge. In addition, the base station also needs to consider, according to a change of a user channel condition, whether a quality guarantee of the negotiated GBR can be maintained. If the base station cannot maintain the guarantee of the GBR due to a worse user channel condition, the base station may send a GBR alternation request to the UE. When the UE receives the GBR alternation request of the base station, the UE needs to check whether a new GBR can guarantee a requirement of the streaming media service, and if the new GBR is excessively low, the UE needs to consider whether to terminate the service.

In a process of receiving data by the UE, when the data is being transmitted to the UE from the server, an actual receiving rate may decrease because congestion occurs in a wired network. In this case, the UE also needs to re-negotiate a new GBR value with the base station, so as to avoid a waste of wireless spectrum resources and reduce a service charge.

In this embodiment, user equipment negotiates in real time with a base station, the base station ensures a transmission rate indicator required by the user equipment, and the user equipment requests corresponding content according to a negotiated rate indicator. In this way, user experience of a service in a wireless environment is ensured, that is, it is ensured that a picture is relatively clear in a case of smooth playing.

A streaming media adaptive transmission method provided by a second embodiment of the present disclosure includes receiving, by a base station, a rate guarantee request that includes a transmission rate and is sent by user equipment, and confirming, according to a spectrum resource that can be provided by the base station and a current transmission channel condition, whether the transmission rate can be guaranteed; if the transmission rate can be guaranteed, sending, to the user equipment, a message for confirming that the transmission rate is available; and if the transmission rate cannot be guaranteed, sending, to the user equipment, a negotiation request including an option of a transmission rate that can be guaranteed by the base station.

To ensure transmission quality, after confirming the transmission rate requested by the user equipment, the method further includes configuring a quality of service indicator including at least one of a packet loss rate, a bit error rate, and a maximum delay.

Further, in a data transmission process, the transmission rate requested by the user equipment cannot be guaranteed due to a cause of the base station or a channel (for example, insufficient resource for the base station, a poor user channel). Therefore, the base station further sends, to the user equipment according to a transmission channel situation reported in real time by the user equipment, a negotiation request including an option of a transmission rate that can be currently guaranteed by the base station.

Figure 5:
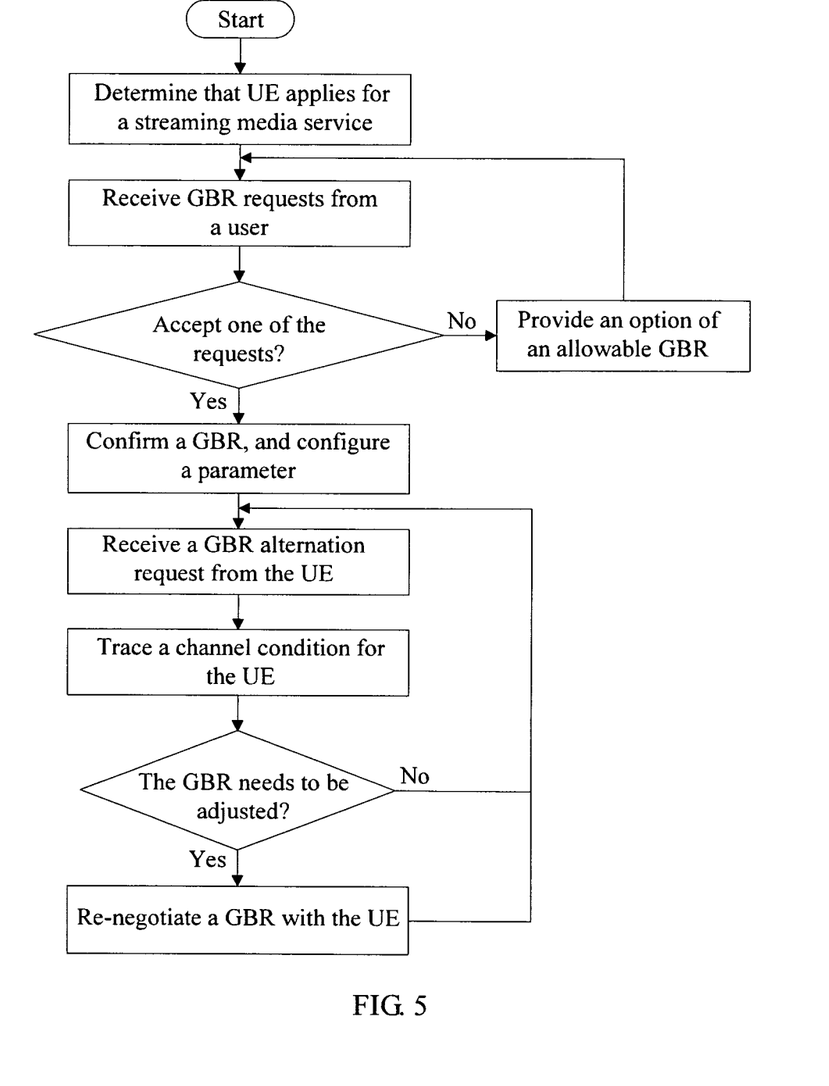
FIG. 5 is a flowchart of guaranteeing quality of adaptive streaming media playing by a base station in a streaming media adaptive transmission method according to an embodiment of the present disclosure.

Similarly, the following provides description using an example in which user equipment adaptively plays streaming media. FIG. 5 shows a process of guaranteeing quality of adaptive streaming media playing in the method in this embodiment.

The base station needs to confirm that a service for which the UE applies is a streaming media playing service. After it is determined that the service for which the UE applies is a streaming media service, the UE may acquire an MPD file from a server and select a corresponding download rate, and therefore, the base station needs to wait for the UE to apply actively for a GBR. After the UE sends one or more GBR requests, the base station determines, according to a resource management method of the base station, whether one of the GBR requests of the UE can be met. If all GBR configurations requested by the UE are inappropriate, the base station selects some rates relatively close to the rates requested by the UE, and sends selected rates to the UE for the UE to perform selection. If at least one of the GBR configurations requested by the UE can be guaranteed, the base station sends confirmation information to the UE, notifying that the UE can establish a connection according to the GBR configuration to perform communication. After completing GBR confirmation with the UE, the base station completes a corresponding configuration and provides a corresponding downlink data communication service.

In a process of receiving the data service by the UE, the UE may re-negotiate a GBR parameter according to a need. In addition, in a process in which a user is moving, a GBR rate that can be guaranteed originally may not be met due to a worse channel condition. In this case, the base station also needs to initiate a GBR re-negotiation procedure with the UE.

Figure 6:
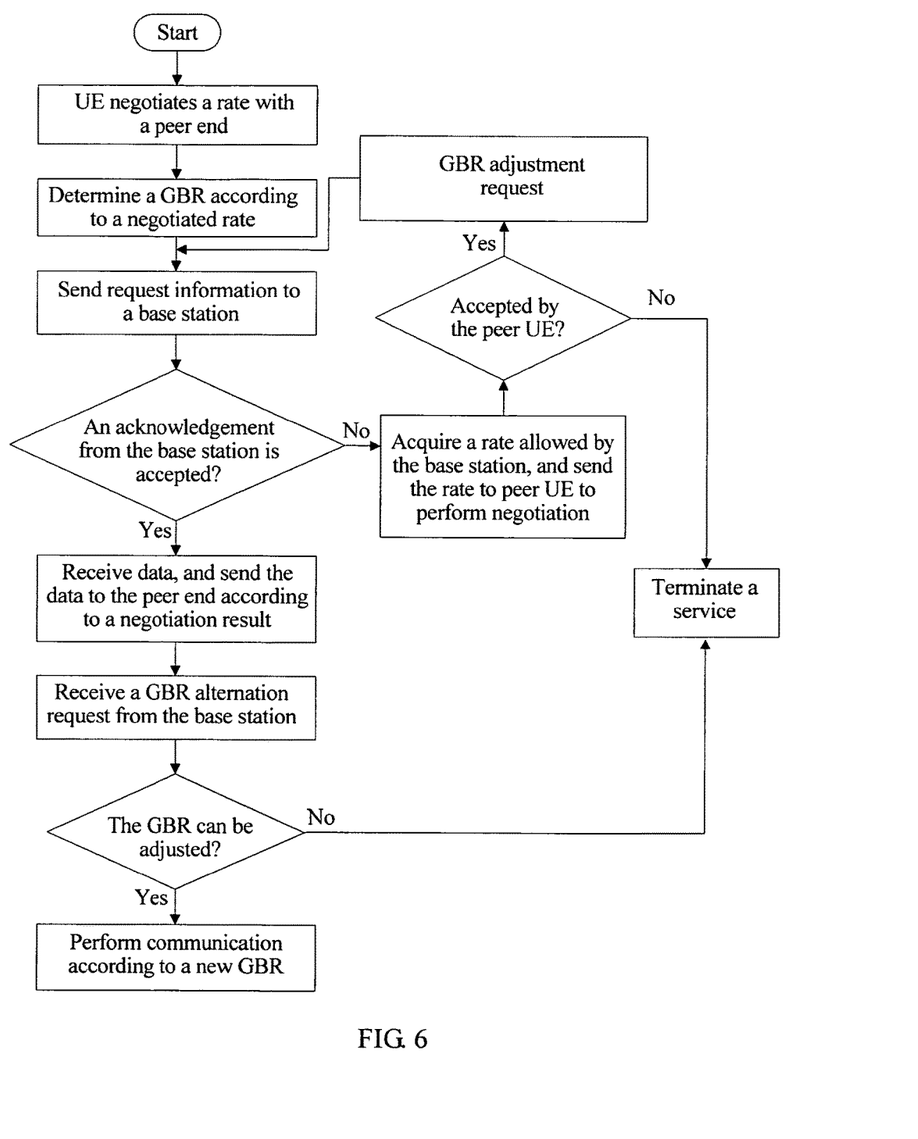
FIG. 6 is a procedure of an adaptive video call on UE according to an embodiment of the present disclosure.

The foregoing streaming media adaptive transmission method is also applicable to a video call scenario. A process thereof is shown in FIG. 6.

In a process of a video call, a data sending end is generally peer UE. A GBR requirement of local end UE (that is, receiving end of video and audio data) is determined by negotiating with the peer UE (that is, sending end of video and audio data) instead. The local end UE negotiates with the peer UE in real time to determine an uplink transmission rate for the peer UE, sends a downlink transmission rate that can be guaranteed by the local end UE to the peer UE, and selects a smaller rate from the uplink transmission rate and the downlink transmission rate as a finally determined transmission rate. It is assumed that the finally determined transmission rate is $V_{min}$, that is, it is determined that both the uplink transmission rate of the peer UE and the downlink transmission rate of the local end UE are $V_{min}$. After completion of rate negotiation, a remaining process is basically the same as a process of adaptively playing streaming media by UE.

In the present disclosure, user equipment negotiates in real time with a base station, the base station ensures a transmission rate indicator required by the user equipment, and the user equipment requests corresponding content according to a negotiated rate indicator. In this way, user experience of a service in a wireless environment is ensured, that is, it is ensured that a picture is relatively clear in a case of smooth playing.

Figure 7:
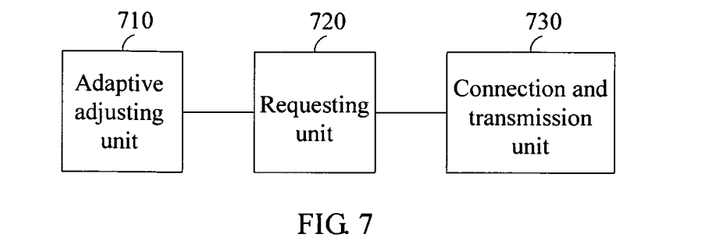
FIG. 7 is a schematic structural diagram of user equipment according to an embodiment of the present disclosure.

As shown in FIG. 7, user equipment provided by a third embodiment of the present disclosure includes an adaptive adjusting unit 710, a requesting unit 720, and a connection and transmission unit 730.

The adaptive adjusting unit 710 is configured to determine in real time a transmission rate of to-be-transmitted data, or determine a transmission rate according to a negotiation request that includes an option of a transmission rate and is provided by a base station. In this embodiment, the adaptive adjusting unit 710 includes a cache monitoring unit configured to monitor cache usage in the user equipment when the transmission rate of the to-be-transmitted data is being determined in real time; an MPD file acquiring unit configured to acquire a media presentation description MPD file from a data sending end, where the data sending end is generally a streaming media server providing media data to be played online; and a transmission rate calculating unit configured to calculate an average transmission rate according to the cache usage, a size of a to-be-transmitted media file in the MPD file, and a predetermined future time period, and use the average transmission rate as the transmission rate during the predetermined future time period, where a specific calculation manner is calculating the average transmission rate in a manner of subtracting the cache usage from the size of the to-be-transmitted media file in the MPD file, and then dividing, by the predetermined time period, a result obtained by the subtracting.

The MPD file includes information about a size of a media segment, and the UE knows how much content has already been stored in a cache of the UE. By subtracting a size of the content that has already been stored in the cache from a size of the media segment in a future period of time, for example, in 2 seconds, and dividing, by the 2 seconds, a result obtained by the subtracting, an average transmission rate required for the next 2 seconds is calculated. To make transmission smoother, a transmission rate actually guaranteed by a wireless system should be slightly higher than this value.

To be applied to a video call, the adaptive adjusting unit 710 further includes a rate negotiating unit configured to negotiate with the data sending end in real time to determine an uplink transmission rate for the data sending end, send a downlink transmission rate that can be guaranteed by local end UE (receiving end of video and audio data) to the data sending end, and select a smaller rate from the uplink transmission rate and the downlink transmission rate as the finally determined transmission rate. It is assumed that the finally determined transmission rate is $V_{min}$, that is, it is determined that both the uplink transmission rate of the data sending end and the downlink transmission rate of the user equipment are $V_{min}$. In the video call scenario, the data sending end is generally peer UE (sending end of video and audio data).

The requesting unit 720 is configured to send a rate guarantee request to the base station, where the rate guarantee request includes the transmission rate. The rate guarantee request may further include an application in which one or more rates that are greater than the transmission rate are applied for to the base station. For example, for a case in which average encoding rates are 4.8 Mbps, 1.7 Mbps, and 490 Kbps, the UE may apply to the base station for guaranteed transmission rates of which three GBR rates are 4.8 Mbps, 1.7 Mbps, and 490 Kbps, or the UE may require higher transmission rates, that is, transmission rates of 5 Mbps, 2 Mbps, and 500 Kbps, or the UE may apply to the base station for only the former two higher rate requests, that is, 5 Mbps and 2 Mbps. The base station may select an appropriate value, for example, the rate of 2 Mbps, from the transmission rates according to an actual situation, and confirm with the UE. If the UE agrees upon the selection of the rate of 2 Mbps, a finally negotiated transmission rate is 2 Mbps.

Further, to ensure transmission quality, a QoS indicator including at least one of a packet loss rate, a bit error rate, and a maximum delay is further requested from the base station. These requested indicators may be sent in a separate request, or may be included in the rate guarantee request and sent to be base station.

The connection and transmission unit 730 is configured to, after receiving a message that is for confirming that the transmission rate is available and that is returned by the base station, request, from the data sending end, to-be-transmitted data of which an encoding rate is corresponding to the transmission rate. For a scenario of online playing of streaming media, after establishing a connection with a streaming media server, the UE requests streaming media data with a corresponding encoding rate according to the transmission rate. For example, after the base station confirms a GBR rate of 2 Mbps by negotiating with the UE, the UE needs to apply to the streaming media server for a corresponding media segment file, that is, a media segment file of 1.7 Mbps, so that a picture during streaming media playing can be maintained to be as clear as possible and user experience can also be as good as possible on the premise of smooth playing. For a video call scenario, after establishing a connection with peer UE, the UE receives video and audio data of the peer UE according to the transmission rate.

The transmission rate requested by the user equipment cannot be guaranteed due to a cause of the base station or a channel (for example, insufficient resource for the base station, a poor user channel). In this case, the base station sends an option including a transmission rate that can be guaranteed to the user equipment. Therefore, the adaptive adjusting unit 710 further includes a rate selecting unit configured to trigger the connection and transmission unit 730 to stop transmission when no rate in the option of a transmission rate in the negotiation request that includes the option of a transmission rate and is provided by the base station meets a minimum transmission rate required by the data sending end; or use a rate, which is greater than or equal to a minimum transmission rate, in the option of a transmission rate as the transmission rate. After receiving a message or signaling indicating QoS re-negotiation of the base station, the UE determines, according to the option provided by the base station in combination with the media segment file information provided in the MPD file, whether the UE can continue to request a streaming media service within a range of the rates provided by the base station. If a GBR guarantee provided by the base station is lower than a requirement of the server for a minimum media rate, for example, the base station can provide only a GBR of 400 Kbps, which is lower than a transmission rate requirement of the server for a minimum media encoding rate of 490 Kbps, the UE may choose to stop a service, or select a streaming media service without a guarantee of service quality. If the GBR guarantee provided by the base station is lower than a minimum GBR applied by the UE but can still ensure experience of a minimum rate, for example, in a case in which the UE applies for only rate requests of 5 Mbps and 2 Mbps, the base station replies that only a rate guarantee of 800 Kbps can be provided, then the UE may consider lowering a requirement of service quality, re-apply to the base station for a GBR guarantee of 500 Kbps, and after confirmation by the base station, start to request a media segment file of which an encoding rate is 490 Kbps from the server.

In a process of receiving streaming media data by the user equipment, a requirement for a data transmission rate may change at any time. In a process of receiving data by the UE, the base station may actually provide, for the UE, an average transmission rate higher than a GBR value due to a cause such as a change of a channel condition, thereby resulting in accumulation of buffered data at the UE. When the buffered data at the UE accumulates to a sufficient amount, the UE can decide, in combination with the information about the media segment file size provided in the MPD file, whether the UE can re-negotiate a new GBR value with the base station, so as to lower pressure on the base station and reduce a service charge. In this case, the cache monitoring unit of the adaptive adjusting unit 710 monitors in real time a change of a cache in the user equipment, and the calculation unit re-calculates in the foregoing calculation manner according to cache usage, and determines the transmission rate.

Figure 8:
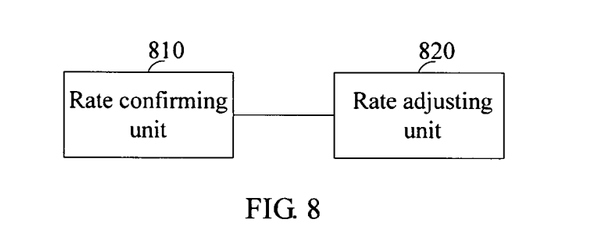
FIG. 8 is a schematic structural diagram of a base station according to an embodiment of the present disclosure.

As shown in FIG. 8, a base station provided by a fourth embodiment of the present disclosure includes a rate confirming unit 810 configured to receive a rate guarantee request that includes a transmission rate and is sent by UE, and confirm, according to a spectrum resource that can be provided by the base station and a current transmission channel condition, whether the requested rate can be guaranteed; if the requested rate can be guaranteed, send a confirmation message to the UE; and if the requested rate cannot be guaranteed, send, to the UE, a negotiation request including an option of a transmission rate that can be guaranteed by the base station.

For a scenario of online playing of streaming media data, the base station needs to confirm that a service for which the UE applies is a streaming media playing service. After it is determined that the service for which the UE applies is a streaming media service, the UE may acquire an MPD file from a server and select a corresponding download rate, and therefore, the base station needs to wait for a need that the UE applies actively for a GBR. After the UE sends one or more GBR requests, the base station determines, according to a resource management method of the base station, whether one of the GBR requests of the UE can be met. If all GBR configurations requested by the UE are inappropriate, the base station selects some rates relatively close to the rates requested by the UE, and sends selected rates to the UE for the UE to perform selection. If at least one of the GBR configurations requested by the UE can be guaranteed, the base station sends confirmation information to the UE, notifying that the UE can establish a connection according to the GBR configuration to perform communication. After completing GBR confirmation with the UE, the base station completes a corresponding configuration and provides a corresponding downlink data communication service.

To ensure transmission quality, the rate confirming unit 810 is further configured to, after confirming the transmission rate requested by the UE, configure a QoS indicator including a packet loss rate, a bit error rate, and/or a maximum delay.

Further, the transmission rate requested by the user equipment cannot be guaranteed due to a cause of the base station or a channel (for example, insufficient resource for the base station, a poor user channel). Therefore, the base station further includes a rate adjusting unit 820 configured to send, to the user equipment according to a transmission channel situation reported in real time by the user equipment, a negotiation request including an option of a transmission rate that can be currently guaranteed by the base station. In a transmission process, the base station also needs to consider, according to a change of a user channel condition, whether a quality guarantee of the negotiated transmission rate can be maintained. If the base station cannot maintain the guarantee of the transmission rate due to a worse user channel condition, the rate adjusting unit 820 may send a transmission rate alternation request to the UE. When the UE receives the transmission rate alternation request of the base station, the UE needs to check whether a new transmission rate can guarantee a requirement of a streaming media service. If the new transmission rate can guarantee the requirement of the streaming media service, the UE re-requests the new transmission rate from the base station; and if the new transmission rate is excessively low, the UE needs to consider whether to terminate the service.

Figure 9:
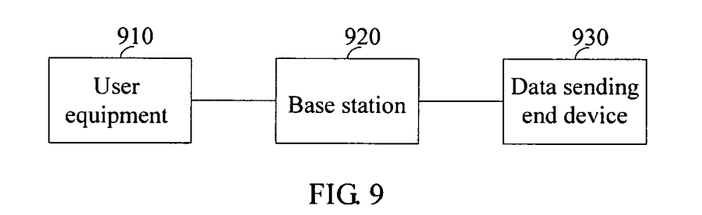
FIG. 9 is a schematic structural diagram of a streaming media adaptive transmission system according to an embodiment of the present disclosure.

As shown in FIG. 9, a streaming media adaptive transmission system provided by a fifth embodiment of the present disclosure includes user equipment 910, a base station 920, and a data sending end device 930. The user equipment 910 determines in real time a transmission rate of to-be-transmitted data or determines a transmission rate according to a negotiation request that includes an option of a transmission rate and is provided by the base station 920, sends a rate guarantee request including the transmission rate to the base station 920, and after receiving a message that is for confirming that the transmission rate is available and that is returned by the base station 920, requests, from the data sending end device 930, to-be-transmitted data of which an encoding rate is corresponding to the transmission rate.

The base station 920 receives the rate guarantee request, and when the base station 920 confirms, according to a spectrum resource that can be provided by the base station 920 and a current transmission channel condition, that the rate guarantee request can be guaranteed, sends, to the user equipment 910, a message for confirming that the transmission rate is available; or when the base station 920 confirms, according to a spectrum resource that can be provided by the base station 920 and a current transmission channel condition, that the rate guarantee request cannot be guaranteed, sends a negotiation request including an option of a transmission rate to the user equipment 910.

The data sending end device 930 receives the request sent by the user equipment 910, and transmits the to-be-transmitted data of which an encoding rate is corresponding to the transmission rate to the user equipment 910.

A person of ordinary skill in the art may understand that, each aspect of the present disclosure or a possible implementation manner of each aspect may be implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A streaming media adaptive transmission method, comprising:
    determining, by user equipment, a transmission rate of to-be-transmitted data in real time by:
        monitoring in real time cache usage in the user equipment;
        acquiring a media presentation description (MPD) file from a data sending end;
        calculating an average transmission rate according to the cache usage, a size of a to-be-transmitted media file in the MPD file, and a predetermined future time period; and
        using the average transmission rate as the transmission rate during the predetermined future time period;
    sending, by the user equipment, a rate guarantee request to a base station, wherein the rate guarantee request comprises the transmission rate; and
    after receiving a message that is for confirming that the transmission rate is available and that is returned by the base station, requesting, by the user equipment from the data sending end, to-be-transmitted data of which an encoding rate is corresponding to the transmission rate.

2. The streaming media adaptive transmission method according to claim 1, wherein the rate guarantee request further comprises one or more rates that are greater than the transmission rate and are requested by the user equipment from the base station.

3. The streaming media adaptive transmission method according to claim 1, wherein when sending the rate guarantee request to the base station, the user equipment further requests, from the base station, a quality of service indicator comprising at least one of a packet loss rate, a bit error rate, and a maximum delay.

4. User equipment, comprising:
    a memory storing executable instructions; and
    a processor coupled to the memory and configured to:

determine a transmission rate of to-be-transmitted data in real time by:
  monitoring cache usage in the user equipment when the transmission rate of the to-be-transmitted data is being determined in real time;
  acquiring, from a data sending end, a media presentation description (MPD) file of the to-be-transmitted data;
  calculating an average transmission rate according to the cache usage, a size of a to-be-transmitted media file in the MPD file, and a predetermined future time period; and
  using the average transmission rate as the transmission rate during the predetermined future time period;
send a rate guarantee request to a base station, wherein the rate guarantee request comprises the transmission rate; and
request, after receiving a message that is for confirming that the transmission rate is available and that is returned by the base station, to-be-transmitted data of which an encoding rate is corresponding to the transmission rate from the data sending end.

5. The user equipment according to claim 4, wherein the rate guarantee request further comprises one or more rates that are greater than the transmission rate and are requested by the user equipment from the base station.

6. The user equipment according to claim 4, wherein the processor is further configured to further request, from the base station, a quality of service indicator comprising at least one of a packet loss rate, a bit error rate, and a maximum delay when sending the rate guarantee request to the base station.

7. A streaming media adaptive transmission system, comprising:
  a data sending end device;
  user equipment; and
  a base station, wherein both the user equipment and the data sending end device are connected to the base station, wherein the user equipment determines a transmission rate of to-be-transmitted data in real time by:
  monitoring in real time cache usage in the user equipment;
  acquiring a media presentation description (MPD) file of the data sending end;
  calculating an average transmission rate according to the cache usage, a size of a to-be-transmitted media file in the MPD file, and a predetermined future time period; and
  using the average transmission rate as the transmission rate during the predetermined future time period;
wherein the user equipment sends a rate guarantee request comprising the transmission rate to the base station, and after receiving a message that is for confirming that the transmission rate is available and that is returned by the base station, requests, from the data sending end device, to-be-transmitted data of which an encoding rate is corresponding to the transmission rate, wherein the base station receives the rate guarantee request, wherein the base station sends, to the user equipment, a message for confirming that the transmission rate is available when the rate guarantee request can be guaranteed according to a spectrum resource that can be provided by the base station and a current transmission channel condition, wherein the base station sends a negotiation request comprising an option of a transmission rate to the user equipment when the rate guarantee request cannot be guaranteed according to the spectrum resource that can be provided by the base station and the current transmission channel condition, and wherein the data sending end device receives the request sent by the user equipment, and transmits the to-be-transmitted data of which an encoding rate is corresponding to the transmission rate to the user equipment.

* * * * *

UNITED STATES PATENT AND TRADEMARK OFFICE
CERTIFICATE OF CORRECTION

PATENT NO. : 10,004,001 B2
APPLICATION NO. : 14/757714
DATED : June 19, 2018
INVENTOR(S) : Lei Zhou Page 1 of 1

It is certified that error appears in the above-identified patent and that said Letters Patent is hereby corrected as shown below:

Column 18, Claim 7, Line 13 should read:
rate during the predetermined future time period, Signed and Sealed this
Twenty-eighth Day of August, 2018

Andrei Iancu
*Director of the United States Patent and Trademark Office*